(12) United States Patent
Sugita et al.

(10) Patent No.: US 6,879,602 B1
(45) Date of Patent: Apr. 12, 2005

(54) SYNCHRONIZING METHOD AND BRIDGE (75) Inventors: Takehiro Sugita, Kanagawa (JP); Yasunori Maeshima, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/262,922

(22) Filed: Mar. 5, 1999

(30) Foreign Application Priority Data

Mar. 12, 1998 (JP) .......................................... P10-060932

(51) Int. Cl.[7] .............................................. H04J 3/06
(52) U.S. Cl. ....................... 370/503; 710/100; 710/107; 375/359; 375/362; 375/371
(58) Field of Search ................. 370/401, 402, 370/503, 516; 710/100, 101, 104, 107, 110; 375/354, 359, 364, 362, 370, 356, 357, 371, 373

(56) References Cited

U.S. PATENT DOCUMENTS

| | | | | |
|---|---|---|---|---|
| 5,128,971 A | | 7/1992 | Johnson ...................... 375/107 |
| 5,408,506 A | | 4/1995 | Mincher et al. ............ 375/356 |
| 5,428,603 A | * | 6/1995 | Kivett ......................... 370/280 |
| 5,434,996 A | * | 7/1995 | Bell ............................. 713/400 |
| 5,517,505 A | | 5/1996 | Buchholz et al. ......... 370/105.1 |
| 5,557,755 A | * | 9/1996 | Krein et al. ................ 74/551.5 |
| 5,664,165 A | * | 9/1997 | Curry et al. ................. 713/501 |
| 5,692,200 A | * | 11/1997 | Carlson et al. ............. 710/262 |
| 5,721,839 A | * | 2/1998 | Callison et al. ............. 710/110 |
| 5,835,739 A | * | 11/1998 | Bell et al. .................... 710/109 |
| 5,867,496 A | * | 2/1999 | Peres et al. .................. 370/376 |
| 5,870,567 A | * | 2/1999 | Hausauer et al. ........... 710/110 |
| 5,878,272 A | * | 3/1999 | Yanagisawa et al. .......... 710/3 |
| 6,032,261 A | * | 2/2000 | Hulyalkar .................... 713/400 |
| 6,044,414 A | * | 3/2000 | Golick ......................... 710/22 |
| 6,101,566 A | * | 8/2000 | Woods et al. ................ 710/129 |
| 6,128,318 A | * | 10/2000 | Sato ............................. 370/505 |

FOREIGN PATENT DOCUMENTS

| | | | | |
|---|---|---|---|---|
| EP | 0895378 | 2/1999 | ........... H04L/12/56 |
| WO | WO9631033 | 10/1996 | ............. H04L/7/04 |
| WO | WO9962216 | 12/1999 | ............. H04L/7/00 |

* cited by examiner

*Primary Examiner*—Huy D. Vu
*Assistant Examiner*—Roberta Stevens
(74) *Attorney, Agent, or Firm*—Jay H. Maioli (57) ABSTRACT

An offset value corresponding to the difference between counter values of cycle time counters in two buses is obtained and stored, so that the buses are connected, the value of a first cycle time counter is compensated for buy an offset value. The counter value of the first cycle time counter is compared with the counter value of a second cycle time counter, and a time stamp of data is changed corresponding to the offset value.

10 Claims, 8 Drawing Sheets

Fig. 4A  CLOCK
Fig. 4B  SYNCHRONOUS EN
Fig. 4C  ADJUSTMENT TM
Fig. 4D  COUNTER 12
Fig. 4E  COUNTER 11
Fig. 4F  COUNTER COMPENSATED VALUE
Fig. 4G  OUTPUT VALUE OF SUBTRACTING CIRCUIT 13

SYNCHRONIZING METHOD AND BRIDGE

BACKGROUND OF THE INVENTION

1. Field of the Invention

The present invention relates to a bridge that connects networks, in particular, to a synchronizing method and a bridge for synchronizing buses when they are connected.

2. Description of the Related Art

Audio units and video units have been digitized as with for example CD (Compact Disc) players, MD (Mini Disc) recorders/players, digital VCRs, digital cameras, and DVD (Digital Versatile Disc) players. As personal computers have become common, systems that connect such digital audio units or digital video units to personal computers have been proposed. As an interface that accomplishes a system that connects such digital audio units or such digital video units to a personal computer, IEEE (Institute of Electronics Engineers) 1394 is becoming attractive.

The IEEE 1394 interface supports both an isochronous transmission mode and an asynchronous transmission mode. The isochronous transmission mode is suitable for transmitting chronologically continuous data streams such as video data and audio data at high speed. The asynchronous transmission mode is suitable for transmitting various commands and files. Since the IEEE 1394 interface supports both the isochronous transmission mode and the asynchronous transmission mode, when the IEEE 1394 interface is used, video data and audio data can be transmitted between digital audio units and between digital video units, respectively. With a personal computer connected to such digital units through the IEEE 1394 interface, the user can easily control and edit video data and audio data.

The IEEE 1394 interface is a wired interface. To structure such a system with a wired interface, cable connections are required. In addition, such cable connections tend to become complicated. Moreover, with a wired interface, it is difficult to connect units that are disposed in different rooms.

Figure 7:
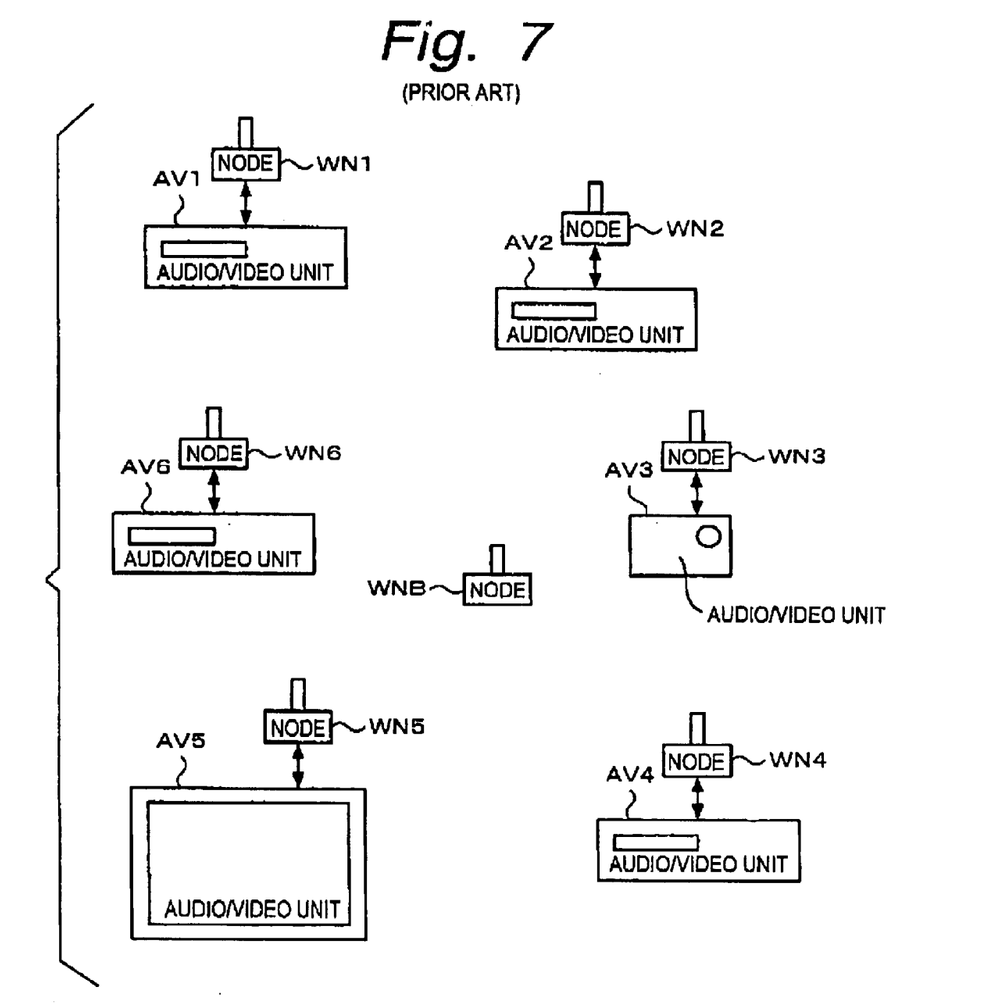
FIG. 7 is a schematic diagram showing an example of a wireless LAN.

Thus, the applicant of the present invention has proposed a wireless LAN (Local Area Network) that connects a digital audio unit or a digital video unit and a personal computer so as to wirelessly communicate therebetween. FIG. 7 shows an example of such a wireless LAN.

In FIG. 7, WN1, WN2, WN3, . . . are wireless nodes as communicating stations. Digital audio units or digital video units AV1, AV2, . . , such as a CD player, an MD recorder/player, a digital VCR, a digital camera, a DVD player, and a television receiver can be connected to the wireless nodes WN1, WN2, . . . In addition, a personal computer can be connected to the wireless nodes WN1, WN2, WN3, . . . Each of the digital audio units and digital video units AV1, AV2, . . . connected to the wireless nodes WN1, WN2, . . . has the IEEE 1394 digital interface. The wireless nodes WN1, WN2, . . . and the digital audio units and digital video units AV1, AV2, . . . are connected with the IEEE 1394 digital interface.

WNB is a wireless node as a controlling station. The wireless node WNB as the controlling station exchanges control data with the wireless nodes WN1, WN2, . . . as the communicating stations. The wireless nodes WN1, WN2, . . . as the communicating stations communicate each other under the control of the wireless node WNB as the controlling station. The wireless nodes WN1, WN2, . . . as the communicating stations wirelessly exchange chronologically continuous data streams (isochronous data) and asynchronous data such as commands.

It can be considered that a system that wirelessly transmits IEEE 1394 digital data is a system of which buses are connected with a bridge.

Figure 8:
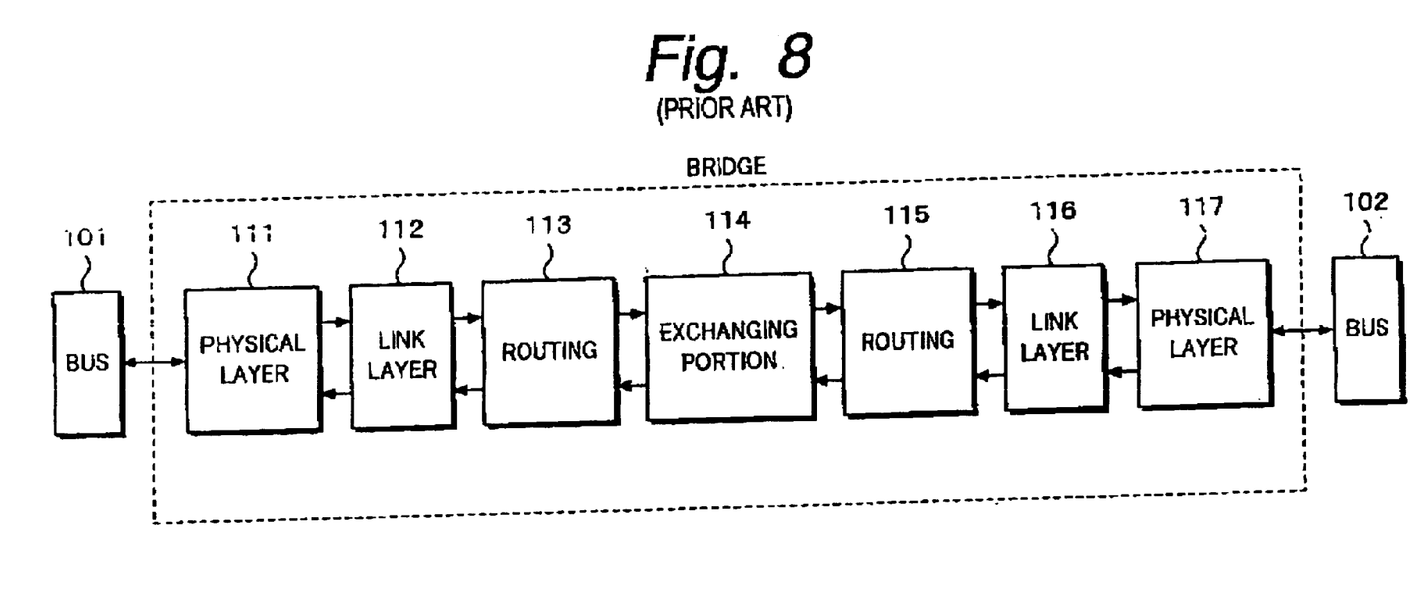
FIG. 8 is a functional block diagram showing the structure of a bridge.

The bridge matches a physical layer and a link layer on one bus side with those on another bus side, performs a routing process for nodes that communicate data with each other, and exchanges data through a transmission path. FIG. 8 is a functional block diagram showing the structure of such a bridge. Referring to FIG. 8, the bridge comprises a physical layer portion 111, a link layer portion 112, a physical layer portion 117, a link layer portion 116, a routing portion 113, a routing portion 115, and a data exchanging portion 114. The physical layer portion 111 matches a physical layer of a first bus 101 with that of a second bus 102. The link layer portion 112 matches a link layer of the first bus 101 with that of the second bus 102. The physical layer portion 117 matches the physical layer of the second bus 102 with that of the first bus 101. The link layer portion 116 matches the link layer of the second bus 102 with that of the first bus 101. The routing portion 113 routes data of the first bus 101 to the second bus 102. The routing portion 115 routes data of the second bus 102 to the first bus 101. The data exchanging portion 114 exchanges data between the first bus 101 and the second bus 102.

Figure 9:
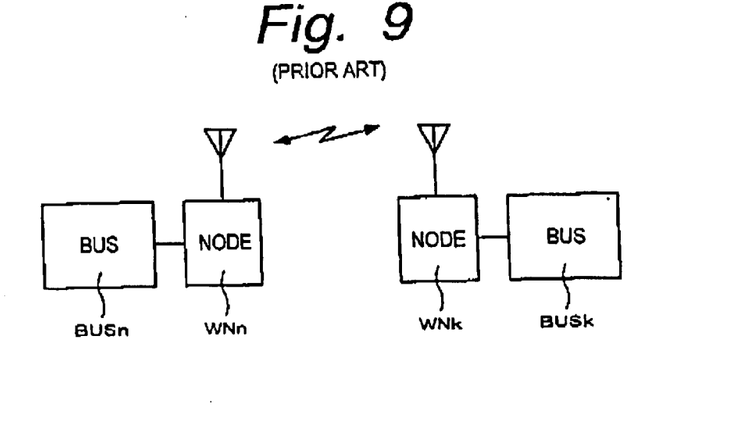
FIG. 9 is a block diagram for explaining a wireless LAN.

In a wireless LAN, as shown in FIG. 9, data is wirelessly communicated between a wireless node WNn and a wireless node WNk. At this point, an IEEE 1394 bus BUSn connected to the wireless node WNn corresponds to the first bus. An IEEE 1394 bus BUSk connected to the wireless node WNk corresponds to the second bus. Data is communicated between the wireless node WNn and the wireless node WNk. The wireless node WNn has the physical layer portion 111, the link layer portion 112, and the routing portion 113. The wireless node WNk has the physical layer portion 117, the link layer portion 116, and the routing portion 115. The transmission path of the exchanging portion 114 is a wireless transmission path.

Thus, as described above, it can be considered that a system that wirelessly transmits IEEE 1394 data is a system of which IEEE 1394 buses are connected with a bridge.

IEEE 1394 data is transmitted frame by frame. The IEEE 1394 data contains a time stamp. When buses that transmit data with a time stamp are connected with a bridge, cycle time counters of the buses are synchronized so as to constantly transmit data. In addition, the time stamp is changed so as to compensate the process time of the bridge.

Figure 10:
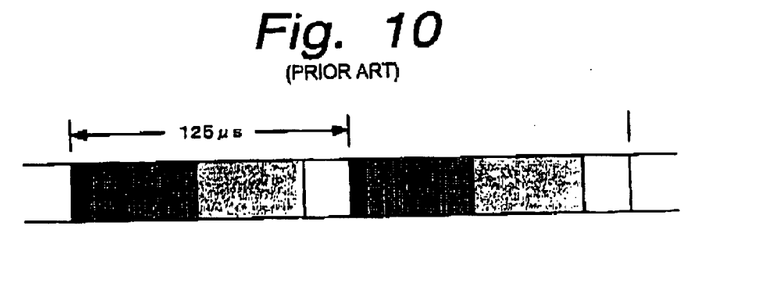
FIG. 10 is a schematic diagram showing the frame structure of IEEE 1394 data.

As shown in FIG. 10, in the IEEE 1394 data, one frame is composed of 125 μm. Corresponding to the cycle start packet information transmitted frame by frame and the deviations of the counter values, the counters are synchronized.

The cycle time counter is composed of a first counter, a second counter, and a third counter. The first counter counts frame intervals at 24.57 MHz. The second counter counts lines at frame intervals. The third counter counts seconds. The bit length of the cycle time counter is 32 bits.

Figure 11:
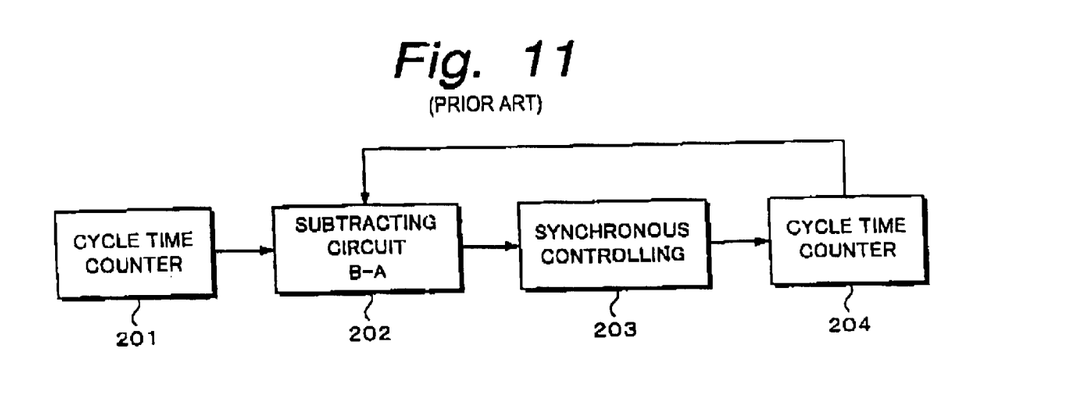
FIG. 11 is a block diagram showing an example of a synchronizing circuit in a conventional bridge.

FIG. 11 is a block diagram showing an example of the structure of a conventional synchronizing circuit that synchronizes cycle time counters of a first bus and a second bus. In FIG. 11, reference numeral 201 is a first bus side cycle time counter. Reference numeral 204 is a second bus side cycle time counter.

A counter value of the first bus side cycle time counter 201 is supplied to a subtracting circuit 202. A counter value of the second bus side cycle time counter 204 is supplied to the subtracting circuit 202. The subtracting circuit 202 subtracts the counter value of the cycle time counter 204 from the counter value of the cycle time counter 201.

An output value of the subtracting circuit 202 is supplied to a synchronous controlling circuit 203. The synchronous controlling circuit 203 outputs a deviation control signal corresponding to the output value of the subtracting circuit 202. The deviation control signal is supplied to the cycle time counter 204. The cycle time counter 204 is controlled corresponding to the deviation control signal.

When two buses are connected, the counter value of the cycle time counter 201 is different from the counter value of the cycle time counter 204. Thus, the counter value of the cycle time counter 201 should be synchronized with the counter value of the cycle time counter 204.

Thus, when the buses are connected with the bridge, the counter value of the cycle time counter 204 is initialized with the counter value of the cycle time counter 201. Consequently, the counter value of the cycle time counter 201 is matched with the counter value of the cycle time counter 204. In other words, after the counter value of the cycle time counter 204 is initialized with the counter value of the cycle time counter 201 and then the counter value of the cycle time counter 201 is matched with the counter value of the cycle time counter 204, the synchronous controlling circuit 303 controls the counter value of the cycle time counter 204 corresponding to the resultant value of which the counter value of the cycle time counter 201 is subtracted from the counter value of the cycle time counter 204.

However, when the counter value of the cycle time counter 204 is initialized with the counter value of the cycle time counter 201, since the counter value of the cycle time counter 204 is discontinuously changed, data transmission should be instantaneously stopped.

To prevent the data transmission from being instantaneously suspended, the counter value of the cycle time counter 204 may be gradually matched with the counter value of the cycle time counter 201. However, since the bit length of each of the cycle time counters is 32 bits, a long adjustment time period is required.

OBJECT AND SUMMARY OF THE INVENTION

Therefore, an object of the present invention is to provide a synchronizing method and a bridge for synchronizing buses of a plurality of nodes that transmit and receive data while synchronizing frames free of instantaneous suspension of data communication.

A first aspect of the present invention is a synchronizing method of a network of buses connected with a bridge, the buses having a plurality of nodes that transmit and receive data while synchronizing frames, the synchronizing method comprising the steps of detecting an offset of synchronous timings of the buses that are connected, and maintaining the synchronization of frames while keeping the offset so as to connect the buses.

A second aspect of the present invention is a bridge for connecting buses having a plurality of nodes that transmit and receive data while synchronizing frames, comprising a means for detecting an offset of synchronous timings of the buses that are connected, and a controlling means for maintaining synchronous timings while maintaining the offset.

Since time stamps of data that flows in the bridge are compensated using time stamps of the data, delay time of data in the bridge, and an offset value of the cycle time counters, the data can be quickly synchronized free of instantaneous suspension of data communication without need to match the counter values of the cycle time counters of the buses.

These and other objects, features and advantages of the present invention will become more apparent in light of the following detailed description of a best mode embodiment thereof, as illustrated in the accompanying drawings.

DETAILED DESCRIPTION OF THE PREFERRED EMBODIMENT

Figure 1:
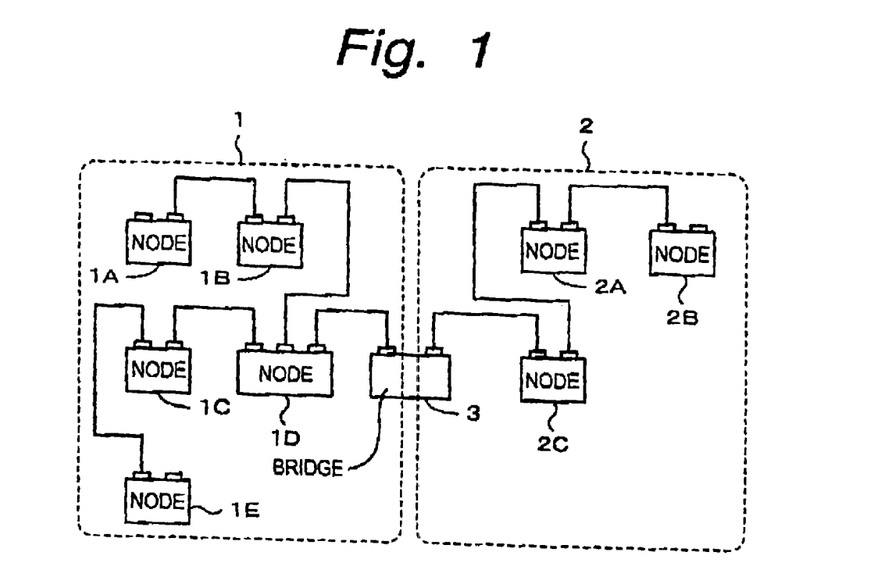
FIG. 1 is a block diagram for explaining a connection of buses with a bridge.

Next, with reference to the accompanying drawings, an embodiment of the present invention will be described. FIG. 1 shows a structure of which buses connected to a plurality of nodes are connected with a bridge. In FIG. 1, reference numerals 1 and 2 are buses corresponding to the IEEE 1394 standard (hereinafter, these buses may be referred to as IEEE 1394 buses). The first bus 1 is composed of nodes 1A, 1B, 1C, . . . The second bus 2 is composed of nodes 2A, 2B, 2C, . . . The bus 1 and the bus 2 are connected with a bridge 3.

In the bridge that connects the IEEE 1394 buses, data contains a time stamp. The buses should be synchronized. According to the present invention, when the buses are connected, time stamps of data that flows in the bridge are compensated using delay time in the bridge and an offset value of which the counter value of a cycle time counter of one bus is subtracted from that of the other bus.

Figure 2:
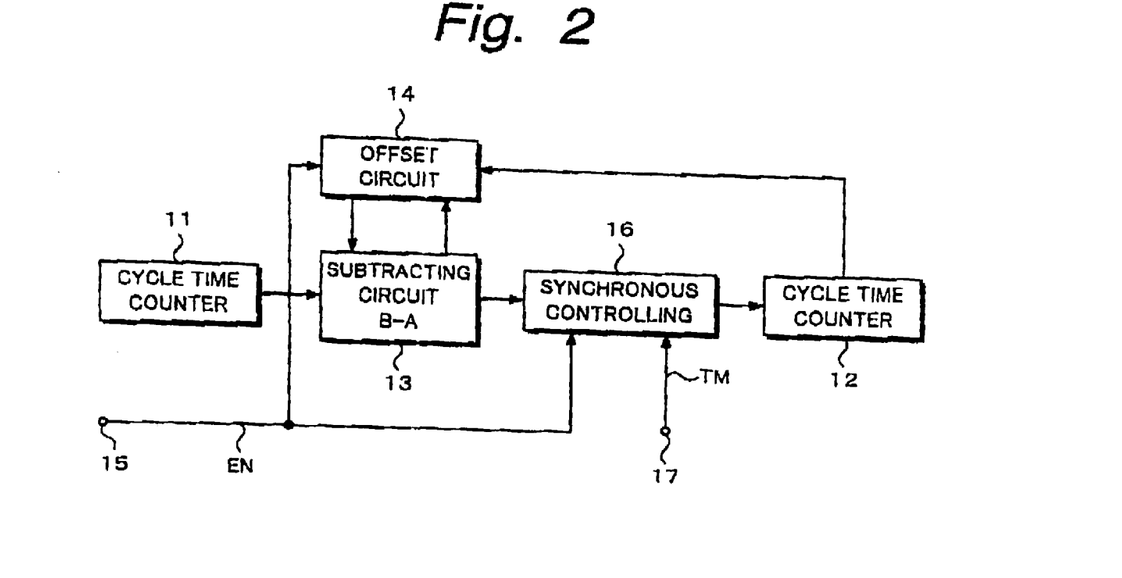
FIG. 2 is a block diagram showing an example of the structure of a synchronizing circuit in the bridge according to the present invention.

FIG. 2 is a block diagram showing an example of the structure of a synchronizing circuit according to the present invention. In FIG. 2, reference numeral 11 is a first bus side cycle time counter. Reference numeral 12 is a second bus side cycle time counter.

The counter value of the first bus side cycle time counter 11 is supplied to a subtracting circuit 13. The counter value of the second bus side cycle time counter 12 is supplied to an offset circuit 14.

A synchronous enable signal EN is supplied from a terminal 15 to an offset circuit 14. When the signal level of the synchronous enable signal EN is low, the counter value of the second bus side cycle time counter 12 is directly output. When the signal level of the synchronous enable signal EN becomes high, the counter value of the cycle time counter 12 is compensated with the offset value. The compensated value is supplied to the subtracting circuit 13.

Figure 3:
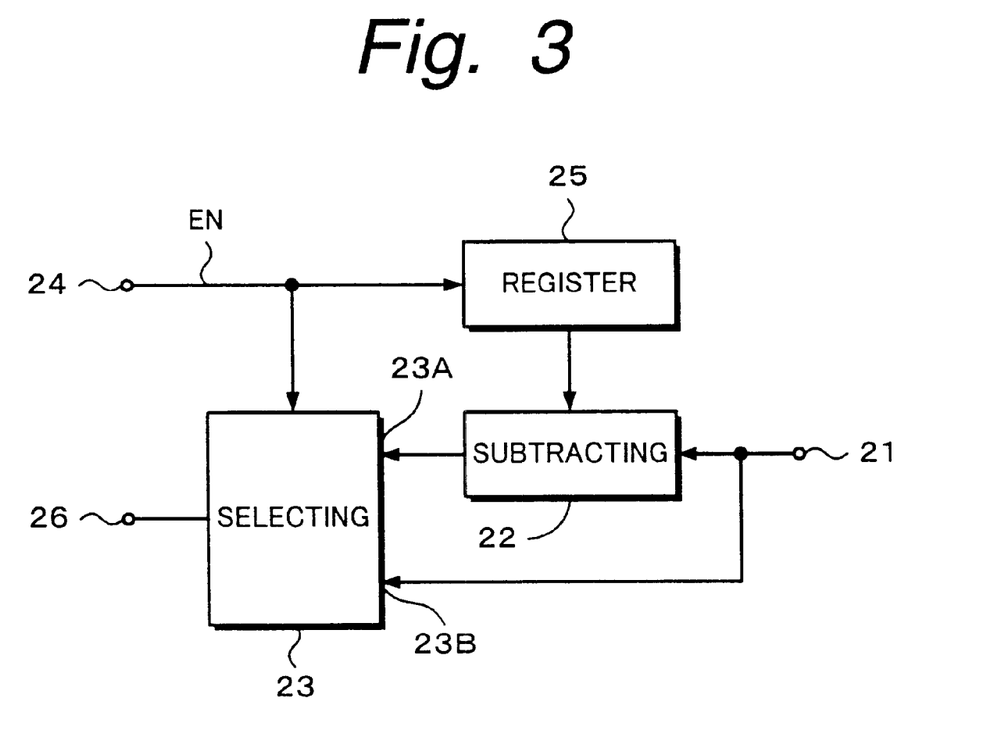
FIG. 3 is a block diagram showing an example of the structure of an offset circuit of the synchronizing circuit in the bridge according to the present invention.

FIG. 3 is a block diagram showing the structure of the offset circuit 14. In FIG. 3, the counter value of the second bus side cycle time counter 12 is supplied to an input terminal 21. The synchronous enable signal EN is supplied to an input terminal 24. The synchronous enable signal EN is supplied to both a register 25 and a selector 23. When the signal level of the synchronous enable signal EN becomes high, the register 25 stores an offset value of which the counter value of the cycle time counter 12 is subtracted from the counter value of the cycle time counter 11. When the signal level of the enable signal EN is high, the selector 23 is placed on a terminal 23A side. When the signal level of the synchronous enable signal EN is low, the selector 23 is placed on a terminal 23B side.

The counter value of the second bus side cycle time counter 12 is supplied to the input terminal 21. The counter value is supplied to both the subtracting circuit 22 and a terminal 23B of the selector 23. The offset value is supplied from the register 25 to the subtracting circuit 22. The subtracting circuit 22 subtracts the counter value of the second bus side cycle time counter 12 from the offset value received from the register 25. An output value of the subtracting circuit 22 is supplied to the terminal 23A of the selector 23. An output value of the selector 23 is output from an output terminal 26.

When the signal level of the synchronous enable signal EN is low, the selector 23 is placed on the terminal 23B side. Thus, the counter value of the second bus side cycle time counter 12 that has been received from the input terminal 21 is output from the output terminal 26 through the selector 23.

When the signal level of the synchronous enable signal EN becomes high, the offset value is stored in the register 25. Thereafter, the selector 23 is placed on the terminal 23A side. Thus, the subtracting circuit 22 subtracts the counter value of the cycle time counter 12 from the offset value. Consequently, the counter value of the cycle time counter 12 is compensated with the offset value. The resultant value is output as a counter compensated value from the output terminal 26.

In FIG. 2, the synchronous enable signal EN is supplied to the terminal 15. When the signal level of the synchronous enable signal EN is low, the offset circuit 14 outputs the counter value of the second bus side cycle time counter 12. Thus, the subtracting circuit 13 subtracts the counter value of the cycle time counter 12 from the counter value of the cycle time counter 11. The resultant value is supplied as the offset value to the offset circuit 14. The offset value is stored in the register 25 of the offset circuit 14.

When the signal level of the synchronous enable signal EN received from the terminal 15 becomes high, the offset circuit 14 outputs a counter compensated value of which the counter value of the cycle time counter 12 has been compensated with the offset value. The subtracting circuit 13 subtracts the counter compensated value from the counter value of the cycle time counter 11.

An output value of the subtracting circuit 13 is supplied to a synchronous controlling circuit 16. In addition, the synchronous enable signal EN is supplied from the terminal 16 to the synchronous controlling circuit 16. Moreover, an adjustment timing signal TM is supplied from a terminal 17 to the synchronous controlling circuit 16.

When the signal level of the synchronous enable signal EN received from the terminal 15 is high, the synchronous controlling circuit 16 generates a deviation control signal at a timing of the adjustment timing signal TM. The deviation control signal is supplied to the cycle time counter 12. When the signal level of the synchronous enable signal EN received from the terminal 15 is low, the cycle time counter 12 operates.

Next, with reference to a timing chart shown in FIG. 4A, 4B, 4C, 4D, 4E, 4F, and 4G, the operation of the synchronizing circuit shown in FIG. 2 will be described.

Figures 4A, 4B, 4C, 4D:
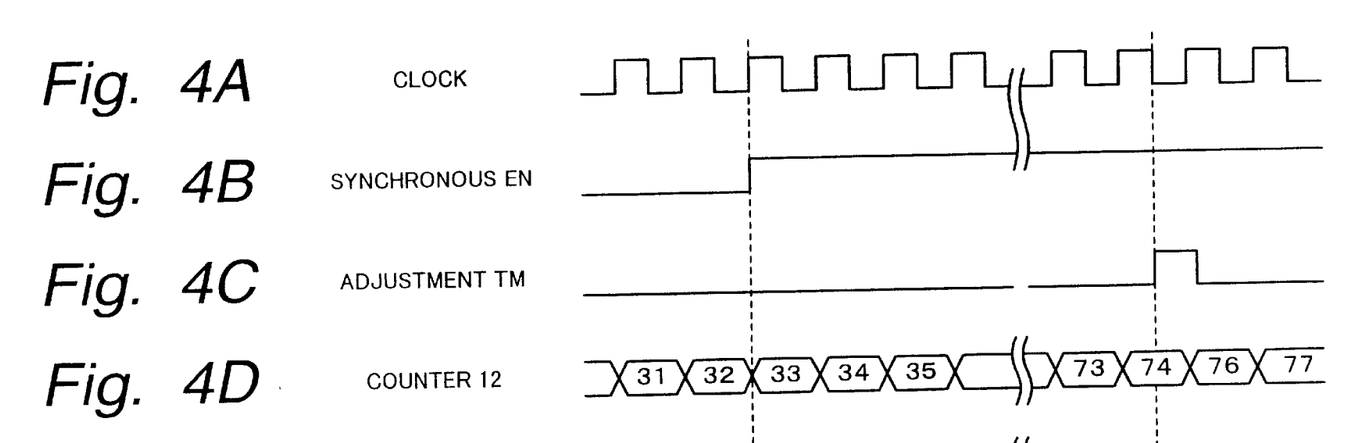
FIGS. 4A, 4B, 4C, 4D, 4E, 4F, and 4G are a timing chart for explaining an example of the synchronizing circuit in the bridge according to the present invention.

As shown in FIG. 4B, the signal level of the synchronous enable signal EN is low until time point t1. As shown in FIG. 4D, when the signal level of the synchronous enable signal EN is low, the cycle time counter 12 operates. Thus, the counter value (see FIG. 4E) of the cycle time counter 11 is regardless of the counter value (see FIG. 4D) of the cycle time counter 12.

Figures 4E, 4F, 4G:
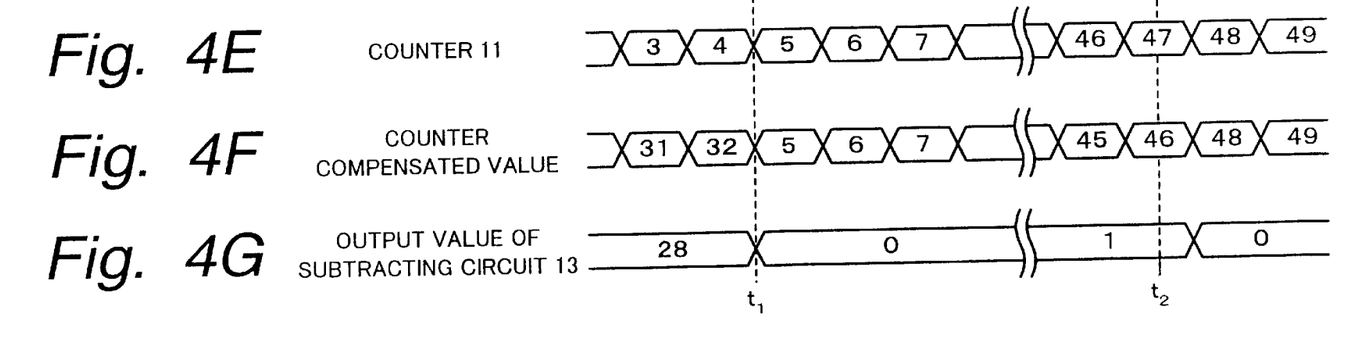

As shown in FIG. 4F, until time point t1 at which the signal level of the synchronous enable signal EN becomes low, the offset circuit 14 outputs the counter value (see FIG. 4D) of the cycle time counter 12. The subtracting circuit 13 subtracts the counter value (see FIG. 4D) of the cycle time counter 12 from the counter value (see FIG. 4E) of the cycle time counter 11. Thereafter, as shown in FIG. 4G, the subtracting circuit 13 outputs the resultant value.

In other words, when the counter value of the cycle time counter 11 is "3", "4", . . . as shown in FIG. 4E and the counter value of the cycle time counter 12 is "31", "32", . . . , as shown in FIG. 12, the output value of the subtracting circuit 13 is "28". Thus, until time point t1 at which the signal level of the synchronous enable signal EN is low, the subtracting circuit 13 outputs value "28". The value "28" is stored as an offset value to the register 25.

When the signal level of the synchronous enable signal EN becomes high at time point t1, the offset circuit 14 outputs the counter compensated value of which the counter value of the cycle time counter 12 has been compensated with the offset value. In other words, as shown in FIG. 4D, when the counter value of the cycle time counter 12 is "33", "34", . . . , the counter value of the cycle time counter 12 is subtracted from the offset value "28". Thus, as shown in FIG. 4F, the offset circuit 14 outputs "5", "6", . . .

The subtracting circuit 13 subtracts the compensated counter value from the counter value of the cycle time counter 11 and outputs the subtracted value. As shown in FIG. 4G, when the compensated counter value (see FIG. 4F) of the cycle time counter 12 is subtracted from the counter value (see FIG. 4E) of the cycle time counter 11, the resultant value becomes "0" just after time point t1 at which the signal level of the synchronous enable signal EN becomes high.

Since the timing of the cycle time counter 11 is adjusted corresponding to the cycle master of the bus, the counter value of the cycle time counter 11 may deviate in a long time counter operation. In this case, the subtracting circuit 13 outputs a non-zero value.

When the subtracting circuit 13 outputs a non-zero value, as shown in FIG. 4C, the signal level of the adjustment timing signal TM becomes high at time point t2. When the signal level of the adjustment timing signal TM becomes high, the synchronous controlling circuit 16 adjusts the deviation of the cycle time counter 12. In this case, as shown in FIG. 4D, the counter value of the cycle time counter 12 is skipped from "74" to "76" so that the output value of the subtracting circuit 13 becomes "0".

In this example, the counter value of one cycle time counter is compensated with the offset value. The frame timings of the two buses are synchronized with the offset value.

Figure 5:
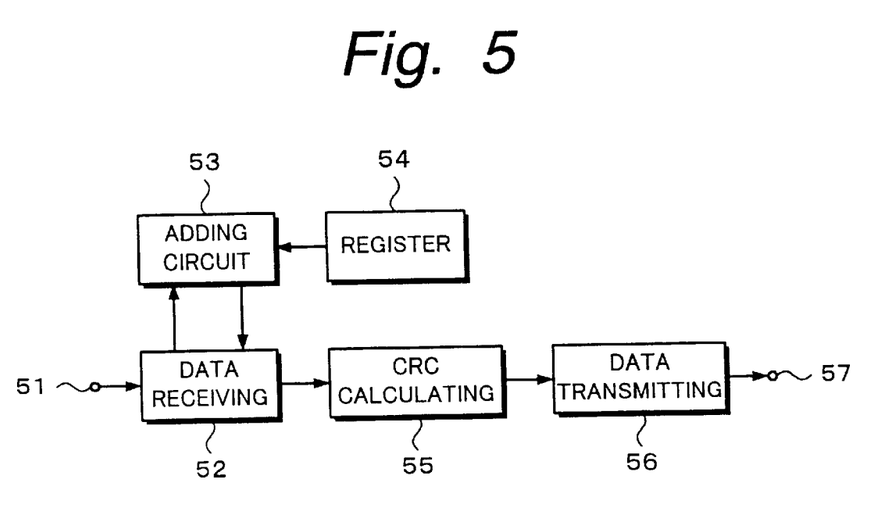
FIG. 5 is a block diagram showing an example of the structure of a time stamp changing circuit in the bridge according to the present invention.
Figure 6A:
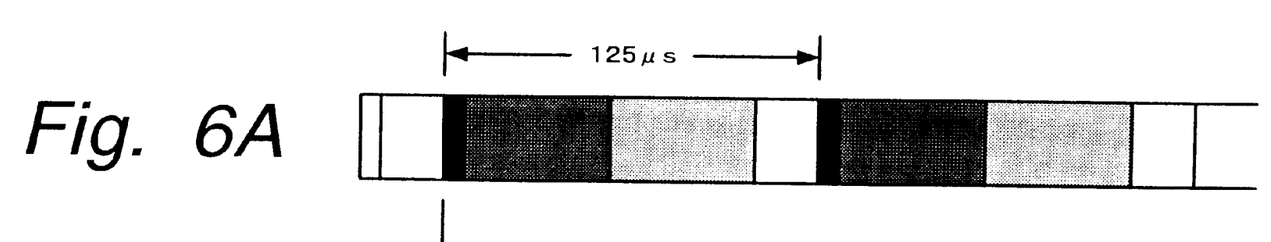
FIGS. 6A and 6B are schematic diagrams showing timings of buses connected with the bridge according to the present invention.
Figure 6B:
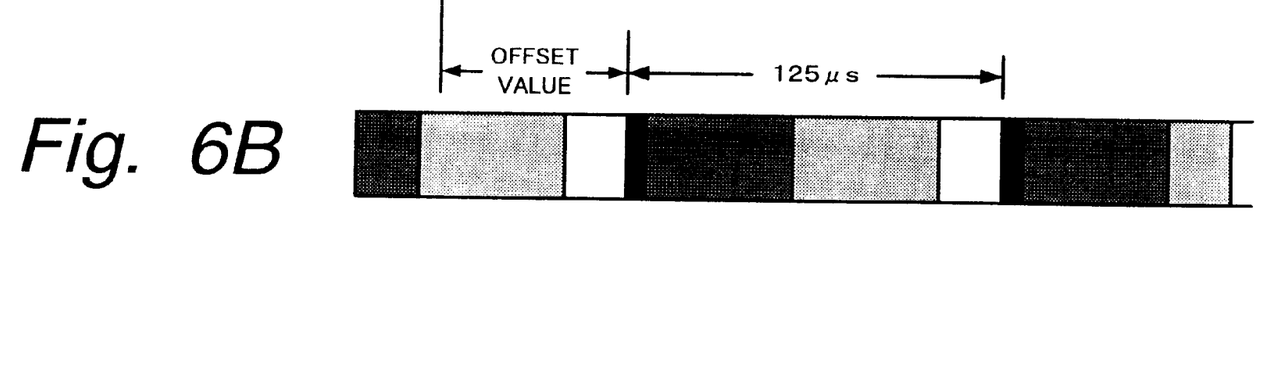

FIG. 5 is a block diagram showing an example of the structure of a time stamp changing circuit in the case that the counter value of a cycle time counter is compensated with the offset value.

In FIG. 5, a time stamp of data received from a first bus is supplied from an input terminal 51 to a data receiving circuit 52. The data receiving circuit 52 extracts the time stamp from data received from the first bus and supplies the extracted time stamp to an adding circuit 53.

An offset value is supplied from a register 54 to the adding circuit 53. As described above, the offset value is obtained by subtracting the counter value of the cycle time counter 12 from the counter value of the cycle time counter 11.

The adding circuit 53 adds the offset value to the time stamp. An output value of the adding circuit 53 is sent back to the data receiving circuit 52. The data receiving circuit 52 performs the time stamp changing process.

The changed time stamp is supplied to an error detection code adding circuit 55. The error detection code adding circuit 55 re-calculates CRC code and changes CRC error detection code.

An output signal of the error detection code adding circuit 55 is supplied to a data transmitting circuit 56. The data transmitting circuit 56 transmits the changed time stamp as an output signal of the other bus from an output terminal 57.

The offset value of which the counter value of the cycle time counter 11 is subtracted from the counter value of the cycle time counter 12 is supplied to the adding circuit 53. In the above-described example, data flows from the terminal 51 side to the terminal 57 side. However, in the bridge, data bidirectionally flows. When data flows in the reverse direction, the input value with the negative sign is supplied to the adding circuit 53.

It should be noted that the present invention is not limited to a wireless bridge. Instead, the present invention can be applied to the case that wireless nodes are wirelessly connected.

In the above-described example, the counter value of a cycle time counter is compensated with an offset value. In other words, in the system according to the present invention, as shown in FIGS. 6A to 6G, a frame (see FIG. 6A) of one bus and a frame (see FIG. 6B) of another bus are synchronized using a constant offset value. Thus, it is not necessary to match the beginnings of frames. Consequently, frames are quickly synchronized free of instantaneous suspension of data transmission.

According to the present invention, when buses having a plurality of nodes that transmit and receive data are connected with a bridge while frames are kept synchronized, an offset of synchronizing timings of the buses is maintained. Thus, it is not necessary to match the synchronizing timings of the buses. The data communication can be prevented from being instantaneously suspended. It takes a long synchronizing time. A time stamp of data that flows in the bridge is changed for a time period corresponding to the process time of the bridge and offset value. Thus, the time stamp and cycle time can be prevented from deviating.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A synchronizing method for a network of buses connected with a bridge, the buses having a plurality of nodes that transmit and receive data while synchronizing frames, the synchronizing method comprising the steps of:

detecting an offset of synchronous timings of the buses of the network that are to be connected; and maintaining a synchronization of the frames while keeping original synchronous timing of the buses by using the offset as a compensation value so as to connect the buses of the network to be connected, wherein the offset is used as the compensation value in response to a first level of a synchronous enable signal, and the offset is not used as the compensation value in response to a second level of the synchronous enable signal.

2. A synchronizing method for a network of buses connected with a bridge, the buses having a plurality of nodes that transmit and receive data while synchronizing frames, the synchronizing method comprising the step of:

detecting an offset of synchronous timings of the buses of the network that are to be connected;

maintaining a synchronization of the frames while keeping original synchronous timings of the buses by using the offset as a compensation value so as to connect the buses of the network to be connected, wherein the offset is used as the compensation value in response to a first level of a synchronous enable signal, and the offset is not used as the compensation value in response to a second level of the synchronous enable signal; and correcting a time stamp of transmitted data corresponding to a value of a process time of the bridge added to the offset.

3. The synchronizing method as set forth in claim 1 or 2, wherein the buses are IEEE 1394 buses.

4. The synchronizing method as set forth in claim 1 or 2 wherein the buses are wireless buses.

5. A bridge for connecting buses having a plurality of nodes that transmit and receive data while synchronizing frames, comprising:

means for detecting an offset of synchronous timings of the buses that are to be connected; and controlling means for maintaining a synchronization of the frames while keeping original synchronous timings of the buses by using the offset as a compensation value, wherein the offset is used as the compensation value in response to a first level of a synchronous enable signal, and the offset is not used as the compensation value in response to a second level of the synchronous enable signal.

6. A bridge for connecting buses having a plurality of nodes that transmit and receive data while synchronizing frames, comprising:

means for detecting an offset of synchronous timings of the buses that are to be connected;

controlling means for maintaining a synchronization of the frames while keeping original synchronous timings of the buses by using the offset as a compensation value, wherein the offset is used as the compensation value in response to a first level of a synchronous enable signal, and the offset is not used as the compensation value in response to a second level of the synchronous enable signal; and means for correcting a time stamp of transmitted data corresponding to a value of a process time of the bridge added to the offset.

7. The bridge as set forth in claim 5 or 6,
wherein the offset is detected as a difference between counter values of cycle time counters of the buses.

8. The bridge as set forth in claim 5 or 6, wherein
Said synchronous maintaining means compensates a counter value of a cycle time counter on a data transmission side, so that the offset is maintained.

9. The bridge as set forth in claim 5 or 6, wherein the buses are IEEE 1394 buses.

10. The bridge as set forth in claim 5 or 6, wherein the buses are wireless buses.

* * * * *